United States Patent
Hu et al.

(10) Patent No.: US 10,747,631 B2
(45) Date of Patent: Aug. 18, 2020

(54) MISSION-CRITICAL AI PROCESSOR WITH RECORD AND REPLAY SUPPORT

(71) Applicant: DinoplusAI Holdings Limited, Grand Cayman (KY)

(72) Inventors: Yujie Hu, Fremont, CA (US); Tong Wu, Fremont, CA (US); Xiaosong Wang, Fremont, CA (US); Zongwei Zhu, Sunnyvale, CA (US); Chung Kuang Chin, Saratoga, CA (US); Clifford Gold, Fremont, CA (US); Steven Sertillange, San Leandro, CA (US); Yick Kei Wong, Union City, CA (US)

(73) Assignee: DINOPLUSAI HOLDINGS LIMITED, Fremont, CA (US)

( * ) Notice: Subject to any disclaimer, the term of this patent is extended or adjusted under 35 U.S.C. 154(b) by 225 days.

(21) Appl. No.: 16/000,718

(22) Filed: Jun. 5, 2018

(65) Prior Publication Data
US 2019/0227887 A1    Jul. 25, 2019

Related U.S. Application Data

(60) Provisional application No. 62/654,761, filed on Apr. 9, 2018, provisional application No. 62/640,800, filed (Continued)

(51) Int. Cl.
*G06F 11/00*    (2006.01)
*G06F 11/20*    (2006.01)
(Continued)

(52) U.S. Cl.
CPC ............ *G06F 11/203* (2013.01); *G06F 1/263* (2013.01); *G06F 1/3206* (2013.01);
(Continued)

(58) Field of Classification Search
CPC .............. G06F 11/203; G06F 11/2028; G06F 11/2033; G06F 11/2051; G06F 1/263;
(Continued)

(56) References Cited

U.S. PATENT DOCUMENTS 7,581,220 B1 *   8/2009   Roeck .................... G06F 9/542
                                                        711/100
7,769,938 B2 *   8/2010   Kaushik ................ G06F 9/3885
                                                        710/268

(Continued)

*Primary Examiner* — Marc Duncan
(74) *Attorney, Agent, or Firm* — Blairtech Solution LLC

(57) ABSTRACT

Embodiments described herein provide a mission-critical artificial intelligence (AI) processor (MAIP), which includes an instruction buffer, processing circuitry, a data buffer, command circuitry, and communication circuitry. During operation, the instruction buffer stores a first hardware instruction and a second hardware instruction. The processing circuitry executes the first hardware instruction, which computes an intermediate stage of an AI model. The data buffer stores data generated from executing the first hardware instruction. The command circuitry determines that the second hardware instruction is a hardware-initiated store instruction for transferring the data from the data buffer. Based on the hardware-initiated store instruction, the communication circuitry transfers the data from the data buffer to a memory device of a computing system, which includes the mission-critical processor, via a communication interface.

17 Claims, 14 Drawing Sheets

Related U.S. Application Data on Mar. 9, 2018, provisional application No. 62/639,451, filed on Mar. 6, 2018, provisional application No. 62/619,505, filed on Jan. 19, 2018.

(51) Int. Cl.
*G06N 3/04* (2006.01)
*G06F 1/3206* (2019.01)
*G06F 1/26* (2006.01)

(52) U.S. Cl.
CPC ...... *G06F 11/2028* (2013.01); *G06F 11/2033* (2013.01); *G06N 3/04* (2013.01)

(58) Field of Classification Search
CPC .... G06F 1/3206; G06F 1/3287; G06F 1/3293; G06N 3/02; G06N 3/04; G06N 3/0454; G06N 3/063
See application file for complete search history.

(56) References Cited

U.S. PATENT DOCUMENTS

| | | | |
|---|---|---|---|
| 8,913,615 B2 * | 12/2014 | Pettey | H04L 29/12009 370/392 |
| 9,614,770 B2 * | 4/2017 | Vasseur | H04L 41/0677 |
| 9,836,691 B1 * | 12/2017 | Narayanaswami | G06N 3/04 |
| 10,175,980 B2 * | 1/2019 | Temam | G06F 9/3001 |
| 2016/0203401 A1 * | 7/2016 | Duranton | G06N 3/06 706/41 |
| 2019/0205746 A1 * | 7/2019 | Nurvitadhi | G06N 3/0445 |
| 2020/0019843 A1 * | 1/2020 | Han | H04L 9/0631 |

\* cited by examiner

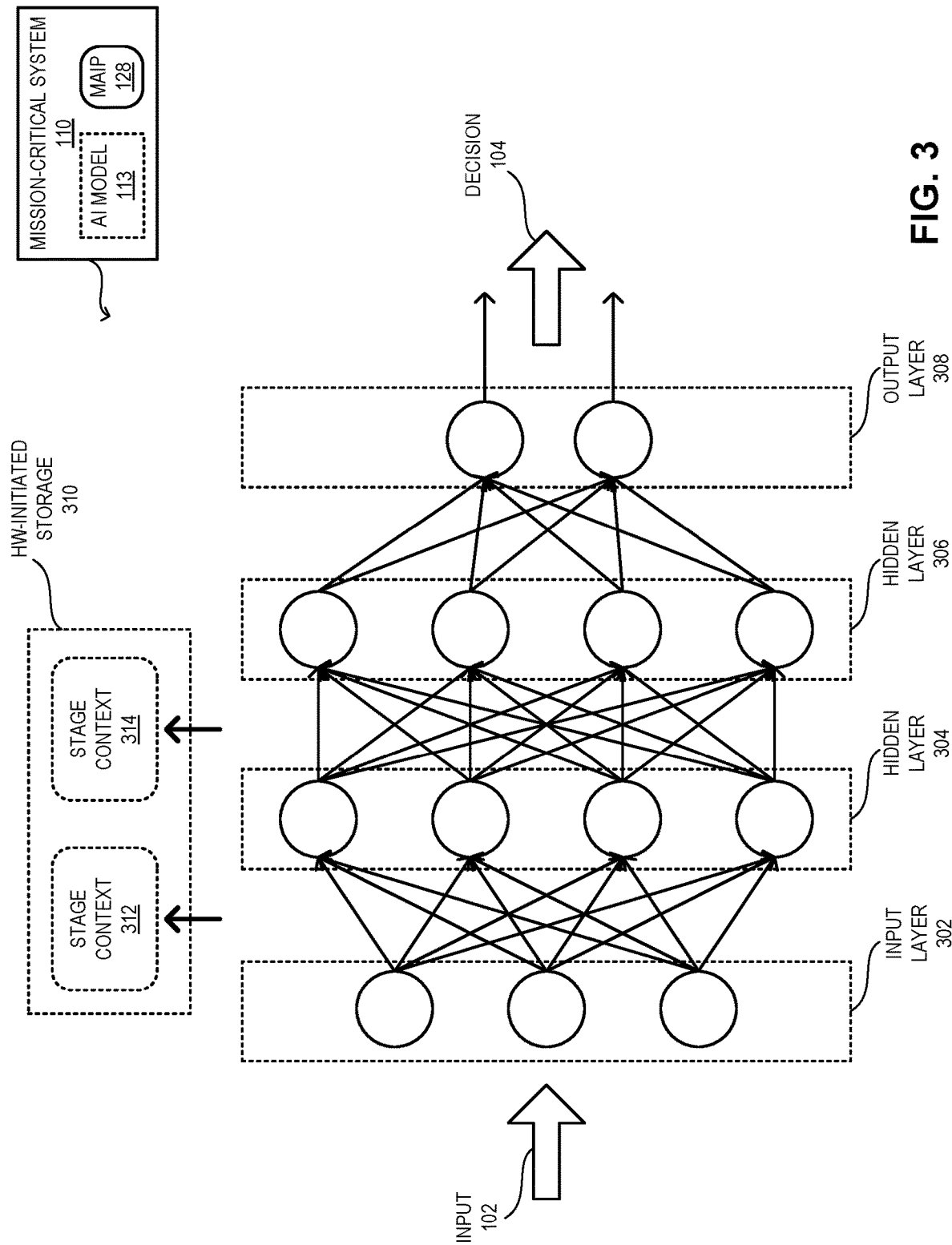

MISSION-CRITICAL AI PROCESSOR WITH RECORD AND REPLAY SUPPORT

RELATED APPLICATION

This application claims the benefit of:

U.S. Provisional Application No. 62/619,505, titled "Mission-Critical AI Processor," by inventors Yujie Hu, Tong Wu, Clifford Gold, Chung Kuang Chin, Xiaosong Wang, and Yick Kei Wong, filed 19 Jan. 2018;

U.S. Provisional Application No. 62/640,800, titled "Artificial Intelligence (AI) Processor that Supports Record and Replay," by inventors Yujie Hu, Tong Wu, Xiaosong Wang, Zongwei Zhu, Chung Kuang Chin, Clifford Gold, Steven Sertillange, and Yick Kei Wong, filed 9 Mar. 2018;

U.S. Provisional Application No. 62/654,761, titled "AI Accelerator Virtualization," by inventors Yujie Hu, Xiaosong Wang, Tong Wu, and Steven Sertillange, filed 9 Apr. 2018; and U.S. Provisional Application No. 62/639,451, titled "Computing Device for Fast Weighted Sum Calculation in Neural Networks," by inventors Cliff Gold, Tong Wu, Yujie Hu, Chung Kuang Chin, Xiaosong Wang, and Yick Kei Wong, filed 6 Mar. 2018;

the disclosures of which are incorporated by reference herein.

BACKGROUND

Field

This disclosure is generally related to the field of artificial intelligence (AI). More specifically, this disclosure is related to a system and method for facilitating a processor capable of processing mission-critical AI applications on a real-time system.

Related Art

The exponential growth of AI applications has made them a popular medium for mission-critical systems, such as a real-time self-driving vehicle or a critical financial transaction. Such applications have brought with them an increasing demand for efficient AI processing. As a result, equipment vendors race to build larger and faster processors with versatile capabilities, such as graphics processing, to efficiently process AI-related applications. However, a graphics processor may not accommodate efficient processing of mission-critical data. The graphics processor can be limited by processing limitations and design complexity, to name a few factors.

As more mission-critical features (e.g., features dependent on fast and accurate decision-making) are being implemented in a variety of systems (e.g., automatic braking of a vehicle), an AI system is becoming progressively more important as a value proposition for system designers. Typically, the AI system uses data, AI models, and computational capabilities. Extensive use of input devices (e.g., sensors, cameras, etc.) has led to generation of large quantities of data, which is often referred to as "big data," that an AI system uses. AI systems can use large and complex models that can infer decisions from big data. However, the efficiency of execution of large models on big data depends on the computational capabilities, which may become a bottleneck for the AI system. To address this issue, the AI system can use processors capable of handling AI models.

Therefore, it is often desirable to equip processors with AI capabilities. Typically, tensors are often used to represent data associated with AI systems, store internal representations of AI operations, and analyze and train AI models. To efficiently process tensors, some vendors have used tensor processing units (TPUs), which are processing units designed for handling tensor-based computations. TPUs can be used for running AI models and may provide high throughput for low-precision mathematical operations.

While TPUs bring many desirable features to an AI system, some issues remain unsolved for handling mission-critical scenarios.

SUMMARY

Embodiments described herein provide a mission-critical artificial intelligence (AI) processor (MAIP), which includes an instruction buffer, processing circuitry, a data buffer, command circuitry, and communication circuitry. During operation, the instruction buffer stores a first hardware instruction and a second hardware instruction. The processing circuitry executes the first hardware instruction, which computes an intermediate stage of an AI model. The data buffer stores data generated from executing the first hardware instruction. The command circuitry determines that the second hardware instruction is a hardware-initiated store instruction for transferring the data from the data buffer. Based on the hardware-initiated store instruction, the communication circuitry transfers the data from the data buffer to a memory device of a computing system, which includes the mission-critical processor, via a communication interface.

In a variation on this embodiment, the communication interface is one of: a peripheral component interconnect express (PCIe) interface; and a network interface card (NIC).

In a variation on this embodiment, the MAIP also includes encryption circuitry, which encrypts the data in the data buffer.

In a variation on this embodiment, the processing circuitry includes a plurality of processing units comprising one or more of: (i) a dataflow processing unit (DPU) comprising a scalar computing unit and a vector computing unit; and (ii) a tensor computing unit (TCU) comprising a cluster of DPUs, high-bandwidth memory devices, and input/output (I/O) devices.

In a further variation, the MAIP includes control circuitry, which operates the processing circuitry in a low-power mode by turning off one or more processing units of the plurality of processing units.

In a variation on this embodiment, the communication circuitry can store computational states of the processing circuitry in a state buffer of the computing system. This allows a second MAIP of the computing system to resume operations associated with the computational states.

In a variation on this embodiment, the communication circuitry stores the data in a storage device of a remote computing device via the communication interface using a remote memory access protocol.

In a variation on this embodiment, the instruction buffer can store the first and second hardware instructions by one of: storing the first and second hardware instructions prior to runtime; and storing the first hardware instruction prior to runtime and dynamically inserting the second hardware instruction during runtime.

In a variation on this embodiment, based on the hardware-initiated store instruction, the communication circuitry also transfers contextual information associated with the MAIP to the memory device. The contextual information includes one or more of: feature maps associated with the data in the data buffer; and information associated with one or more computational units of the MAIP. Such information includes one or more of: temperatures, working conditions, utilization, and performance statistics.

Embodiments described herein provide a system for facilitating hardware instructions to a mission-critical system. During operation, the system identifies an instruction block comprising a set of hardware instructions, which computes an intermediate stage of an artificial intelligence (AI) model. A respective instruction of the instruction block is executable on a mission-critical AI processor (MAIP). Based on a set of parameters, the system determines whether contexts associated with the instruction block should be recorded. If the contexts associated with the instruction block should be recorded, the system appends a hardware-initiated instruction to the instruction block. The hardware-initiated instruction initiates a transfer of data generated by the instruction block to outside of the MAIP. The system then provides the instruction block with the hardware-initiated instruction to the MAIP.

In a variation on this embodiment, the set of parameters includes available storage, communication bandwidth, and external inputs, which includes a policy of a datacenter, customer preferences, developer preferences, and environmental feedback.

In a variation on this embodiment, the system provides the instruction block to the MAIP prior to runtime of the MAIP.

Embodiments described herein provide a mission-critical system, which includes a system processor, a system memory device, a communication interface, and a first mission-critical artificial intelligence (AI) processor (MAIP) coupled to the communication interface, and an operating module. The first MAIP can include an instruction buffer, processing circuitry, a data buffer, command circuitry, and communication circuitry. During operation, the operating module loads a first and a second hardware instructions in the instruction buffer of the first MAIP. The processing circuitry executes the first hardware instruction, which computes an intermediate stage of an AI model. The data buffer stores data generated from executing the first hardware instruction. The command circuitry determines that the second hardware instruction is a hardware-initiated store instruction for transferring the data from the data buffer. Based on the hardware-initiated store instruction, the communication circuitry transfers the data from the data buffer to the system memory device via the communication interface.

In a variation on this embodiment, the communication interface is one of: a peripheral component interconnect express (PCIe) interface; and a network interface card (NIC).

In a variation on this embodiment, the processing circuitry of the first MAIP includes a plurality of processing units comprising one or more of: (i) a dataflow processing unit (DPU) comprising a scalar computing unit and a vector computing unit; and (ii) a tensor computing unit (TCU) comprising a cluster of DPUs, high-bandwidth memory devices, and input/output (I/O) devices.

In a variation on this embodiment, the system also includes a backup power source and power circuitry. The power circuitry can detect a power failure of the system, switch the first MAIP to the backup power source, and reduce operations of the first MAIP to save power.

In a variation on this embodiment, the system also includes a state buffer and high-availability circuitry. The state buffer stores computational states of the first MAIP. The high-availability circuitry can detect a failure of the first MAIP. The high-availability circuitry then loads the computational states of the first MAIP to a second MAIP from the state buffer and resumes operations associated with the computational states using the second MAIP.

In a variation on this embodiment, the system also includes a network interface, which can transfer the data from the memory device to a remote computing system for replaying the data.

In a variation on this embodiment, the operating module can load both the first and second hardware instructions upon powering up of the mission-critical system prior to runtime. Alternatively, the operating module can load the first hardware instruction upon powering up of the mission-critical system prior to runtime and dynamically insert the second hardware instruction during runtime.

In a variation on this embodiment, based on the hardware-initiated store instruction, the communication circuitry of the first MAIP also transfers contextual information associated with the first MAIP to the system memory device. The contextual information includes one or more of: feature maps associated with the data in the data buffer; and information associated with one or more computational units of the first MAIP. Such information includes one or more of: temperatures, working conditions, utilization, and performance statistics.

BRIEF DESCRIPTION OF THE FIGURES

FIG. 3 illustrates an exemplary hardware-initiated storage instruction of an MAIP, in accordance with an embodiment of the present application.

In the figures, like reference numerals refer to the same figure elements.

DETAILED DESCRIPTION

Figure 1A:
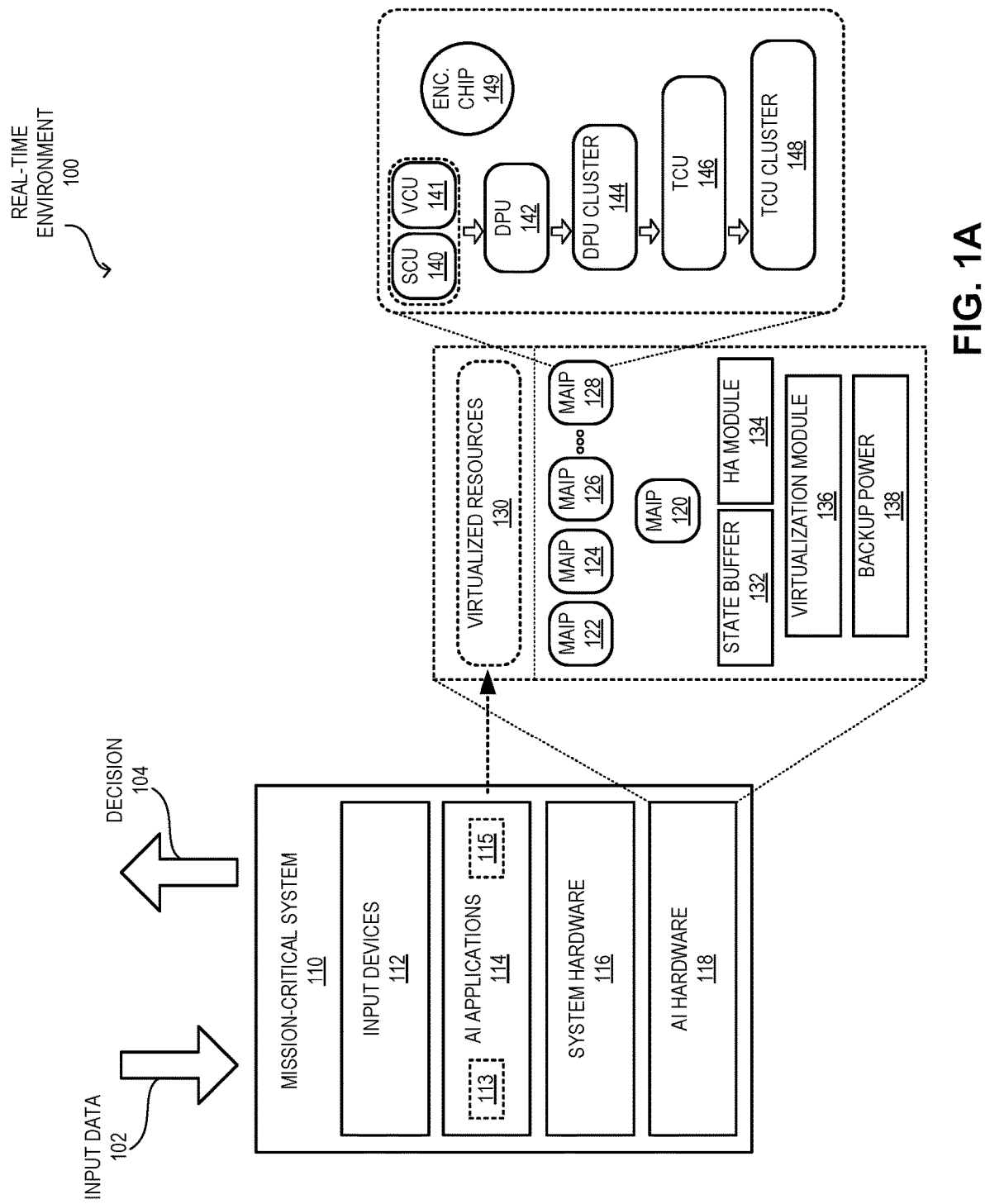
FIG. 1A illustrates an exemplary mission-critical system equipped with mission-critical AI processors (MAIPs) supporting storage and replay, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of facilitating an AI processor for mission-critical systems by (i) incorporating high-availability, resource virtualization, encryption, and power adjustment capabilities into a processor; and (ii) facilitating an instruction or instruction set that allows record and replay of the process of the predictions and decisions.

Many mission-critical systems rely on AI applications to make instantaneous and accurate decisions based on the surrounding real-time environment. An AI application can use one or more AI models (e.g., a neural-network-based model) to produce a decision. Usually the system uses a number of input devices, such as sensors (e.g., sonar and laser), cameras, and radar, to obtain real-time data. Since the system can use a large number of such input devices, they may generate a large quantity of data based on which the AI applications make decisions. To process such a large quantity of data, the system can use large and complex AI models that can generate the decisions. For example, the safety features of a car, such as automatic braking and lane departure control, may use an AI model that processes real-time data from on-board input devices of the car.

With existing technologies, AI applications may run on graphics processing units (GPUs) or tensor processing units (TPUs). Typically, a GPU may have a higher processing capability among these two options (e.g., indicated by a high floating point operations per second (FLOPS) count). However, since a GPU is designed for vector and matrix manipulations, the GPU may not be suitable for all forms of tensor. In particular, since a mission-critical system may use data from a variety of input devices, the input data can be represented based on tensors with varying dimensions. As a result, the processing capabilities of the GPU may not be properly used for all AI applications.

On the other hand, a TPU may have the capability to process tensor-based computations more efficiently. However, a TPU may have a lower processing capability. Furthermore, some TPUs may only be efficiently used for applying AI models but not for training the models. Using such a TPU on a mission-critical system may limit the capability of the system to learn from a new and dynamic situation. Therefore, existing GPUs and TPUs may not be able to process large and time-sensitive data of a mission-critical system with high throughput and low latency. In addition, existing GPUs and TPUs may not be able to facilitate other important requirements of a mission-critical system, such as high availability and low-power computation for failure scenarios.

Moreover, for some AI models, such as neural-network-based models, the system provides a set of inputs, which is referred to as an input layer, to obtain a set of outputs, which is referred to as an output layer. The results from intermediate stages, which are referred to as hidden layers, are usually not presented to any entity outside of the AI model. As a result, if the predictions and decisions generated by the AI model are insufficient (i.e., the AI model fails to produce the correct result) or the system suffers a failure, there may not be sufficient information to analyze what has caused the failures.

To solve these problems, embodiments described herein provide a mission-critical AI processor (MAIP), which can be an AI processor chip, that can process tensors with varying dimensions with high throughput and low latency. Furthermore, the MAIP can provide the capability to record and replay the process of the predictions and decisions, which allows analysis of intermediate stages. A mission-critical system can use one or more MAIPs that can efficiently process the large quantity of data the input devices of the system may generate. Furthermore, an MAIP can also process training data with high efficiency. As a result, the mission-critical system can be efficiently trained for new and diverse real-time scenarios.

Furthermore, since any failure associated with the system can cause critical problems, an MAIP allows real-time handover to a standby MAIP if that MAIP suffers a failure. In some embodiments, the MAIP can maintain current computational results and operational states in a memory that can be handed over to the standby MAIP to resume operations. This feature allows the system to facilitate high availability in critical failure scenarios. The MAIP can also operate in a reduced computation mode in a power failure. If the system suffers a power failure, the MAIP can detect the failure and switch to a backup power source (e.g., a battery). The MAIP then can only use the resources (e.g., the tensor computing units or TCUs) for processing the critical operations, thereby using low power for computations.

Moreover, the MAIP facilitates hardware-assisted virtualization to AI applications. For example, the resources of the MAIP can be virtualized in such a way that the resources are efficiently divided among multiple AI applications. Each AI application may perceive that the application is using all resources of the MAIP. In addition, the MAIP is equipped with an on-board security chip (e.g., a hardware-based encryption chip) that can encrypt output data of an instruction (e.g., data resultant of a computation associated with the instruction). This prevents any rogue application from accessing on-chip data (e.g., from the registers of the MAIP).

Furthermore, the record and replay feature of the MAIP allows the system (or a user of the system) to analyze stage contexts associated with the intermediate states of an AI model and determine the cause of any failure associated with the system and/or the model. Upon detecting the cause, the system (or the user of the system) can reconfigure the system to avoid future failures. The record and replay feature can be implemented for the MAIP using a dedicated processor/ hardware instruction (or instruction set) that allows the recording of the contexts of the AI model, such as intermediate stage contexts (e.g., feature maps and data generated from the intermediate stages) of the AI model. This instruction can be appended to an instruction block associated with an intermediate stage. The instruction can be preloaded (e.g., inserted prior to the execution) or inserted dynamically during runtime. The replay can be executed on a software simulator or a separate hardware system (e.g., with another MAIP).

The term "processor" refers to any hardware unit, such as an electronic circuit, that can perform an operation, such as a mathematical operation on some data or a control operation for controlling an action of a system. The processor can be an application-specific integrated circuit (ASIC) chip.

The term "application" refers to an application running on a user device, which can issue an instruction for a processor. An AI application can be an application that can issue an instruction associated with an AI model (e.g., a neural network) for the processor.

Exemplary System

FIG. 1A illustrates an exemplary mission-critical system equipped with MAIPs supporting storage and replay, in accordance with an embodiment of the present application. In this example, a mission-critical system 110 operates in a real-time environment 100, which can be an environment where system 110 may make real-time decisions. For example, environment 100 can be an environment commonly used by a person, such as a road system with traffic, and system 110 can operate in a car. Environment 100 can also be a virtual environment, such as a financial system, and system 110 can determine financial transactions. Furthermore, environment 100 can also be an extreme environment, such as a disaster zone, and system 110 can operate on a rescue device.

Mission-critical system 110 relies on AI applications 114 to make instantaneous and accurate decisions based on surrounding environment 100. AI applications 114 can include one or more AI models 113 and 115. System 110 can be equipped with one or more input devices 112, such as sensors, cameras, and radar, to obtain real-time input data 102. System 110 can apply AI model 113 to input data 102 to produce a decision 104. For example, if AI model 113 (or 115) is a neural-network-based model, input data 102 can represent an input layer for the model and decision 104 can be the corresponding output layer.

Since modern mission-critical systems can use a large number of various input devices, input devices 112 of system 110 can be diverse and large in number. Hence, input devices 112 may generate a large quantity of real-time input data 102. As a result, to produce decision 104, AI applications 114 need to be capable of processing a large quantity of data. Hence, AI models 113 and 115 can be large and complex AI models that can generate decision 104 in real time. For example, if system 110 facilitates the safety features of a car, such as automatic braking and lane departure control, continuous real-time monitoring of the road conditions using input devices 112 can generate a large quantity of input data 102. AI applications 114 can then apply AI models 113 and/or 115 to determine decision 104, which indicates whether the car should brake or has departed from its lane.

System 110 can include a set of system hardware 116, such as a processor (e.g., a general purpose or a system processor), a memory device (e.g., a dual in-line memory module or DIMM), and a storage device (e.g., a hard disk drive or a solid-state drive (SSD)). The system software, such as the operating system and device firmware of system 110, can run on system hardware 116. System 110 can also include a set of AI hardware 118. With existing technologies, AI hardware 118 can include a set of GPUs or TPUs. AI applications 114 can run on the GPUs or TPUs of AI hardware 118.

However, a GPU may not be suitable for all forms of tensor. In particular, since system 110 may use data from a variety of input devices 112, input data 102 can be represented based on tensors with varying dimensions. As a result, the processing capabilities of a GPU may not be properly used by AI applications 114. On the other hand, a TPU may have the capability to process tensor-based computations more efficiently. However, a TPU may have a lower processing capability, and may only be efficiently used for applying AI models but not for training the models. Using such a TPU on system 110 may limit the capability of system 110 to learn from a new and dynamic situation.

Therefore, existing GPUs and TPUs may not be able to efficiently process large and time-sensitive input data 102 for system 110. In addition, existing GPUs and TPUs may not be able to facilitate other important requirements of system 110, such as high availability and low-power computation for failure scenarios. Moreover, for some AI models, contexts from intermediate hidden layers, which are derived from input data 102 by applying the models, are usually not presented to any entity outside of the AI model. As a result, if the AI model fails to produce a correct result or system 110 suffers a failure, there may not be sufficient information to analyze what has caused the failure.

To solve these problems, AI hardware 118 of system 110 can be equipped with a number of MAIPs 122, 124, 126, and 128 that can efficiently process tensors with varying dimensions. These MAIPs can also process training data with high efficiency. As a result, system 110 can be efficiently trained for new and diverse real-time scenarios. In addition, these MAIPs are capable of recording and replaying intermediate stages associated with decision 104. AI hardware 118, equipped with MAIPs 122, 124, 126, and 128, thus can efficiently run AI applications 114, which can apply AI models 113 and/or 115 to input data 102 to generate decision 104 with low latency. For example, with existing technologies, if a datacenter uses 100 GPUs, the datacenter may use 10 GPUs for training and 90 GPUs for inference, because 90% of GPUs are typically used for inference. However, similar levels of computational performance can be achieved using 10 MAIPs for training and 15 MAIPs for inference. This can lead to a significant cost savings for the datacenter. Therefore, in addition to mission-critical systems, an MAIP can facilitate efficient computations of AI models for datacenters as well.

An MAIP, such as MAIP 128, can include a TCU cluster 148 formed by a number of TCUs. Each TCU, such as TCU 146, can include a number of dataflow processor unit (DPU) clusters. Each DPU cluster, such as DPU cluster 144, can include a number of DPUs. Each DPU, such as DPU 142, can include a scalar computing unit (SCU) 140 and a vector computing unit (VCU) 141. SCU 140 can include a plurality of traditional CPU cores for processing scalar data. VCU 141 can include a plurality of tensor cores used for processing tensor data (e.g., data represented by vectors, matrices, and/or tensors). In the same way, MAIPs 122, 124, and 126 can include one or more TCU clusters, each formed based on DPUs comprising SCUs and VCUs.

Furthermore, since any failure associated with system 110 can cause a critical problem, system 110 can be equipped with a standby MAIP 120, which may not participate in active processing during normal operation (i.e., without any failure). In addition, AI hardware 118 can include a high availability module 134, which can monitor MAIPs 122, 124, 126, and 128. During operation, MAIP 128 (and other MAIPs of system 110) can maintain current computational results and operational states in a state buffer 132, which can be a memory device. If high availability module 134 detects a failure of MAIP 128, high availability module 134 initiates a real-time handover to standby MAIP 120. MAIP 120 can obtain the computational results and operational states of MAIP 128 from state buffer 132 and resume operations. This feature allows system 110 to facilitate high availability in critical failure scenarios.

In some embodiments, MAIP 128 can also operate in a reduced computation mode in a power failure. If system 110 suffers a power failure, MAIP 128 can detect the failure and switch to a backup power source 138. This power source can be part of AI hardware 118 or any other part of system 110. MAIP 128 then can use the resources (e.g., the TCUs) for processing the critical operations of system 110. MAIP 128 can turn off some TCUs, thereby using low power for computation. System 110 can also turn off one or more of the MAIPs of AI hardware 118 to save power. If the power comes back, system 110 can resume regular computation mode.

Moreover, MAIP 128 can facilitate hardware-assisted virtualization to AI applications. For example, AI hardware 118 can include a virtualization module 136, which can be incorporated in a respective MAIP or a separate module. Virtualization module 136 can present the resources of MAIPs 122, 124, 126, and 128 as virtualized resources 130 in such a way that the resources are efficiently divided among multiple AI applications. Each AI application may perceive that the application is using all resources of an MAIP and/or system 110.

In addition, MAIP 128 can be equipped with an on-board security chip 149, which can be a hardware-based encryption chip. Chip 149 can encrypt output data of an instruction. This data can be resultant of a computation associated with the instruction. This prevents any rogue application from accessing on-chip data stored in the registers of MAIP 128. For example, if an application in AI applications 114 becomes compromised (e.g., by a virus), that compromised application may not access data generated by other applications in AI applications 114 from the registers of MAIP 128.

Furthermore, the record and replay feature of MAIP 128 allows system 110 (or a user of system 110) to analyze stage contexts, such as results from intermediate stages of AI model 113 (or 115), and determine the cause of any failure associated with system 110 and/or AI model 113. Upon detecting the cause, system 110 (or the user of system 110) can reconfigure system 110 to avoid future failures. The record and replay feature can be implemented for MAIP 128 using a dedicated processor/hardware instruction (or instruction set) that can be executed by MAIP 128. The instruction can record the contexts of AI model 113, such as stage contexts (e.g., feature maps and data generated from the intermediate stages) of AI model 113. This instruction can be appended to an instruction block associated with an intermediate stage. The instruction can be preloaded prior to runtime (e.g., after powering up before executing any computational instruction) or inserted dynamically during runtime. The replay can be executed on a software simulator or a separate hardware system.

Figure 1B:
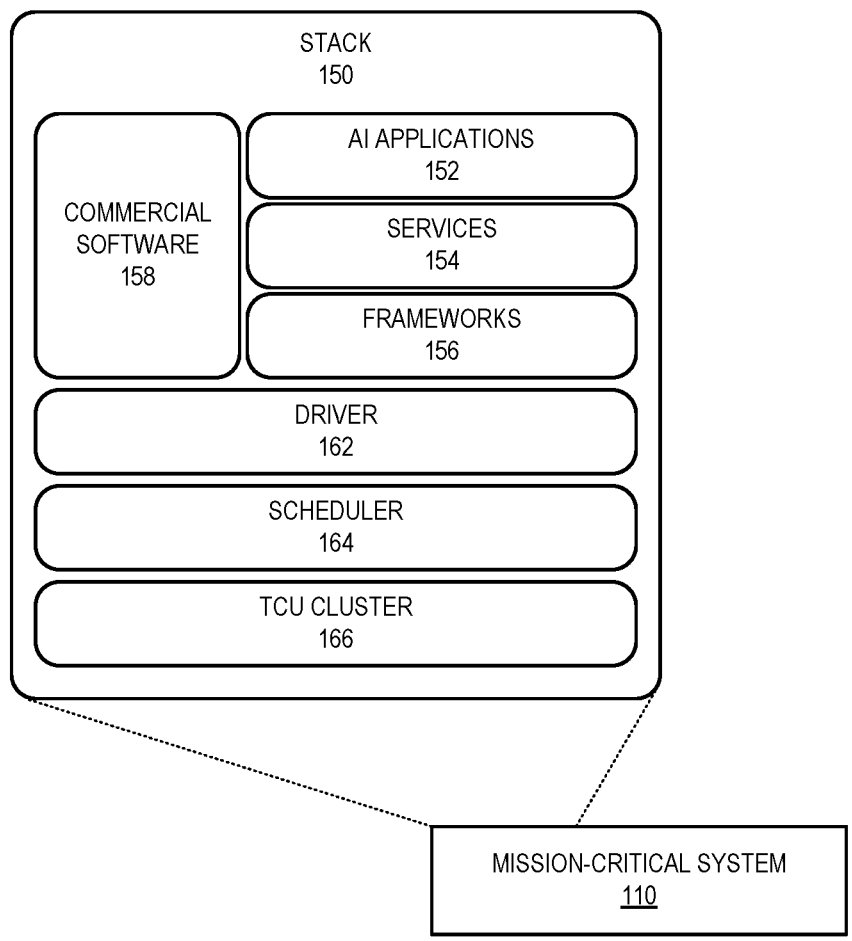
FIG. 1B illustrates an exemplary system stack of a mission-critical system, in accordance with an embodiment of the present application.

FIG. 1B illustrates an exemplary system stack of a mission-critical system, in accordance with an embodiment of the present application. A system stack 150 of system 110 operates based on a TCU cluster 166 (e.g., in an MAIP). A scheduler 164 runs on cluster 166 that schedules the operations on TCU cluster 166. Scheduler 164 dictates the order at which the instructions are loaded on TCU cluster 166. A driver 162 allows different AI frameworks 156 to access functions of TCU cluster 166. AI frameworks 156 can include any library (e.g., a software library) that can facilitate AI-based computations, such as deep learning. Examples of AI frameworks 156 can include, but are not limited to, TensorFlow, Theano, MXNet, and DMLC.

AI frameworks 156 can be used to provide a number of AI services 154. Such services can include vision, speech, natural language processing, etc. One or more AI applications 152 can operate to facilitate AI services 154. For example, an AI application that determines a voice command from a user can use a natural language processing service based on TensorFlow. In addition to AI frameworks 156, driver 162 can allow commercial software 158 to access TCU cluster 166. For example, an operating system that operates system 110 can access TCU cluster 166 using driver 162.

Chip Architecture

Figure 2A:
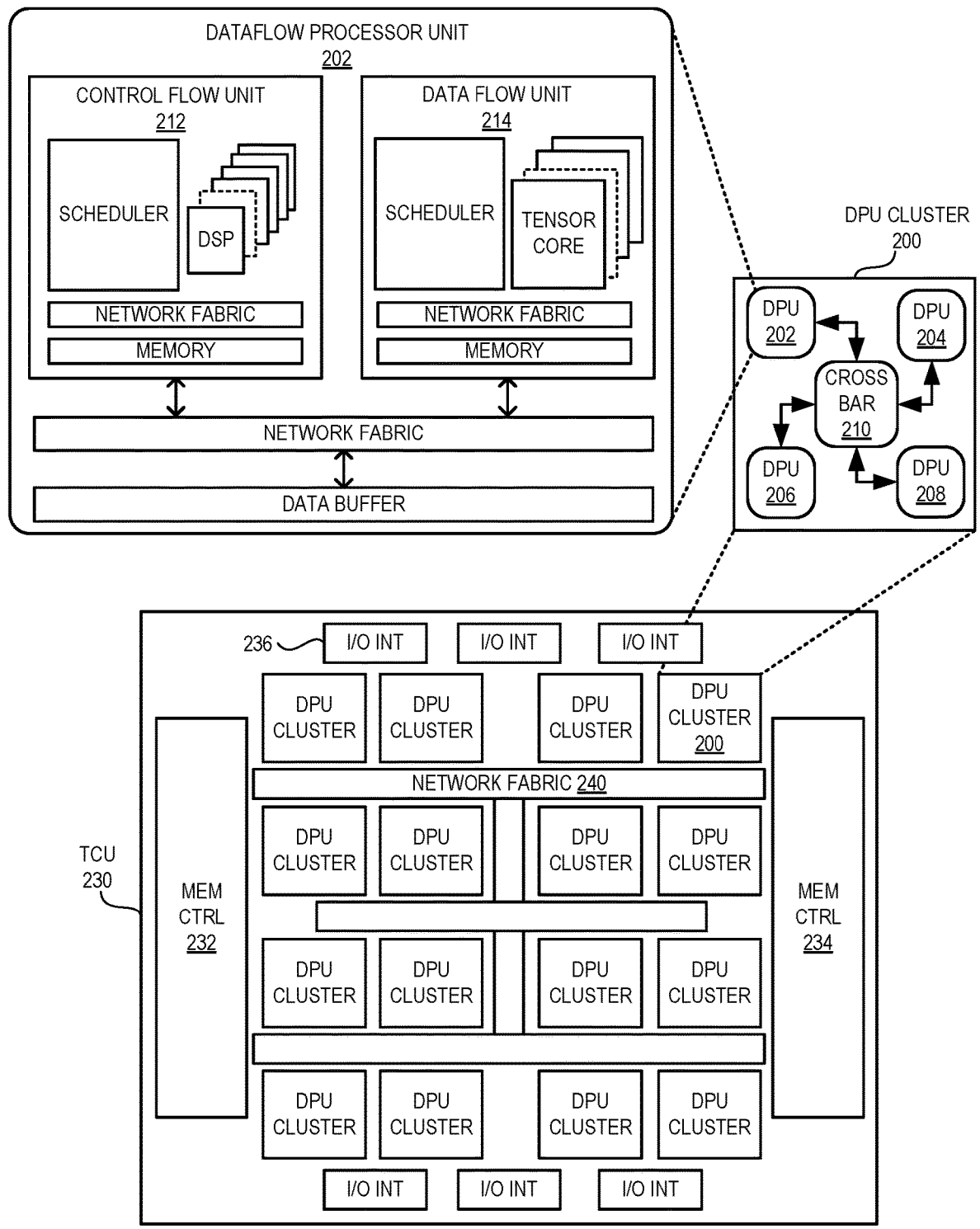
FIG. 2A illustrates an exemplary chip architecture of a tensor computing unit (TCU) in an MAIP supporting storage and replay, in accordance with an embodiment of the present application.

FIG. 2A illustrates an exemplary chip architecture of a TCU in an MAIP supporting storage and replay, in accordance with an embodiment of the present application. A DPU 202 can include a control flow unit (CFU) 212 and a data flow unit (DFU) 214, which are coupled to each other via a network fabric (e.g., a crossbar) and may share a data buffer. CFU 212 can include a number of digital signal processing (DSP) units and a scheduler, a network fabric interconnecting them, and a memory. DFU 214 can include a number of tensor cores and a scheduler, a network fabric interconnecting them, and a memory. A number of DPUs 202, 204, 206, and 208, interconnected based on crossbar 210, form a DPU cluster 200.

A number of DPU clusters, interconnected based on a network fabric 240, can form a TCU 230. One such DPU cluster can be DPU cluster 200. TCU 230 can also include memory controllers 232 and 234, which can facilitate high-bandwidth memory, such as HBM2. TCU 230 can be designed based on a wafer level system integration (WLSI) platform, such as CoWoS. In addition, TCU 230 can include a number of input/output (I/O) interfaces 236. An I/O interface of TCU 230 can be a serializer/deserializer (SerDes) interface that may convert data between serial data and parallel interfaces.

Figure 2B:
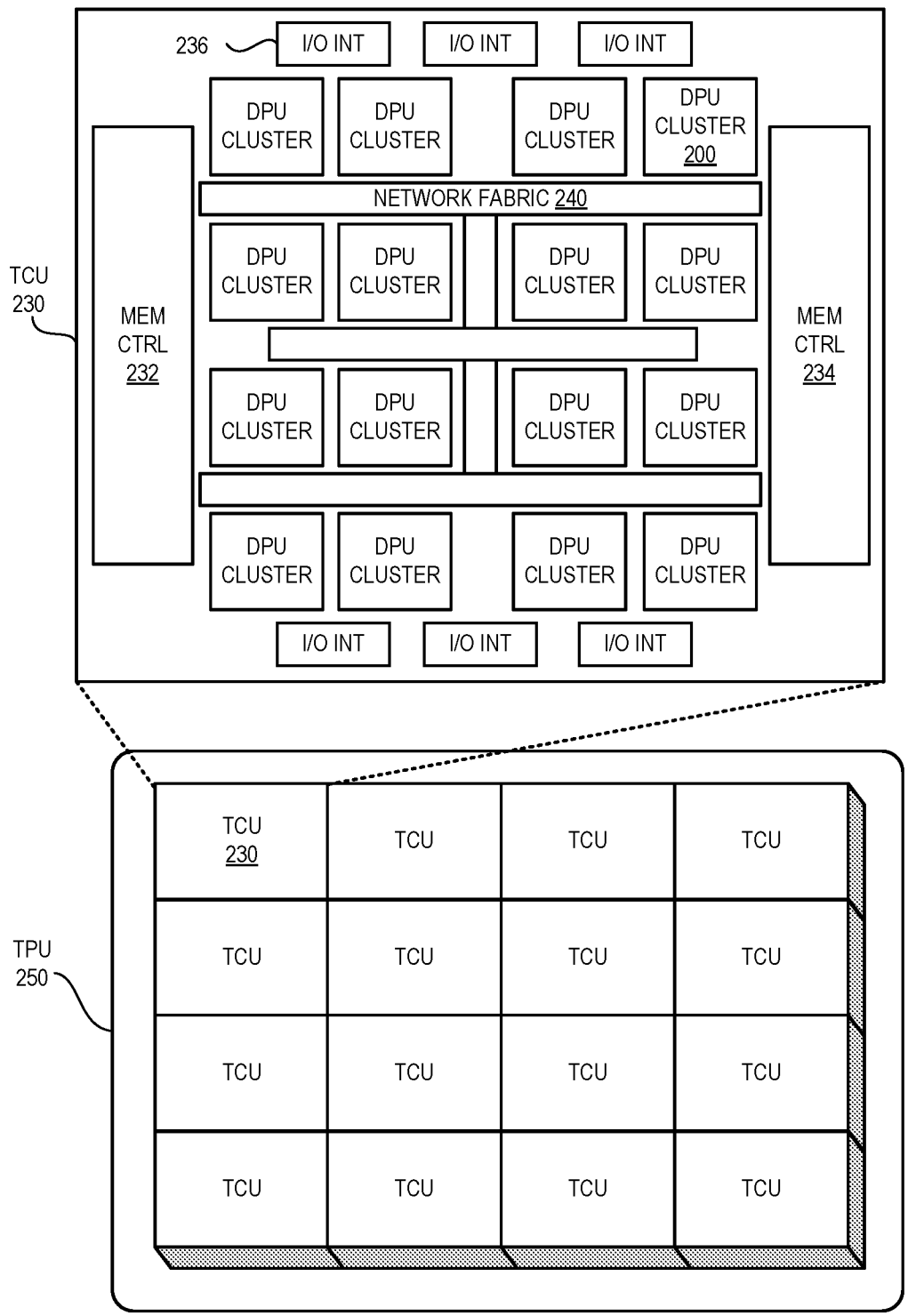
FIG. 2B illustrates an exemplary chip architecture of a TCU cluster in an MAIP supporting storage and replay, in accordance with an embodiment of the present application.

FIG. 2B illustrates an exemplary chip architecture of a TCU cluster in an MAIP supporting storage and replay, in accordance with an embodiment of the present application. Here, a tensor processing unit (TPU) 250 is formed based on a cluster of TCUs. One such TCU can be TCU 230. In TPU 250, the TCUs can be coupled to each other using respective peripheral component interconnect express (PCIe) interfaces or SerDes interfaces. This allows individual TCUs to communicate with each other to facilitate efficient computation of tensor-based data.

Storing Intermediate Stage Contexts

FIG. 3 illustrates an exemplary hardware-initiated storage instruction of an MAIP, in accordance with an embodiment of the present application. AI model 113 can be based on a multi-layer decision process (e.g., a neural network). System 110 can provide a set of inputs, which is referred to as an input layer 302, to AI model 113. AI model 113 can process input layer 302 through one or more intermediate stages, which are referred to as hidden layers, to obtain a set of outputs, which is referred to as an output layer 308. In this example, AI model 113 can have at least two intermediate stages, which are referred to as hidden layers 304 and 306.

With existing technologies, AI model 113 operates based on a "black box" principle, where the computations conducted in hidden layers 304 and 306 are not available outside of AI model 113. In other words, if system 110 (or a user of system 110) wishes to analyze the intermediate computations of AI model 113, system 110 may not gain access to those computations. As a result, if AI model 113 fails to produce the correct result or system 110 fails, data generated by the intermediate computations of hidden layers 304 and 306 may not be available to explain or analyze what has caused the failure.

This problem is solved by incorporating the capability of recording and replaying the computations of each stage of AI model 113 into an MAIP, such as MAIP 128. This allows system 110 (or a user of system 110) to analyze the cause of the failure and, based on the analysis, reconfigure system 110 to avoid future failures. MAIP 128 can support a processor instruction (or instruction set) that can cause MAIP 128 to store the data generated from an instruction block into the memory of system 110. This processor instruction can be a "hardware-initiated store" instruction (e.g., a hardware dump instruction). Since this instruction is hardware initiated, it does not involve the processor cycle of the system processor of system 110 and can be executed in parallel to the operations of the system processor.

It should be noted that this hardware-initiated store instruction is distinct from a software-based store instruction. The software-based store instruction requires the system processor to issue an I/O interrupt, lock the current data on a buffer of MAIP 128, and transfer the data to the system memory. This actually costs an instruction cycle of the system processor. Since system 110 can be equipped with a plurality of MAIPs, each comprising multiple TPUs running AI model 113, system 110 can generate a significant quantity of data associated with the hidden layers. Using a software-based store instruction to store such data may cause the system processor to issue a large number of interrupts and degrade the performance of system 110.

Upon executing the hardware-initiated store instruction, MAIP 128 can record the data stored in its buffer. Hence, this store instruction can be appended after each instruction block representing a layer of AI model 113. For example, the store instruction can be appended to the instruction block that computes the transition from input layer 302 to hidden layer 304. This would cause MAIP 128 to record stage context 312 associated with the computation. Similarly, the store instruction can also cause MAIP 128 to record stage context 314 associated with the computation of the transition from hidden layer 304 to hidden layer 306.

Stage contexts 312 and 314 can provide contexts, such as intermediate feature maps and data generated from computations, for subsequent replay or diagnosis purposes. Information recorded in stage contexts 312 and 314 includes, but is not limited to, intermediate feature maps and processor information, such as temperatures, working conditions, utilization, and statistics. The instruction can be preloaded prior to runtime (e.g., can be inserted offline) or dynamically inserted during runtime. Stage contexts 312 and 314 can be transferred to another system, which then can be used for replaying on a software simulator or an MAIP on that system.

Store and Replay

Figure 4A:
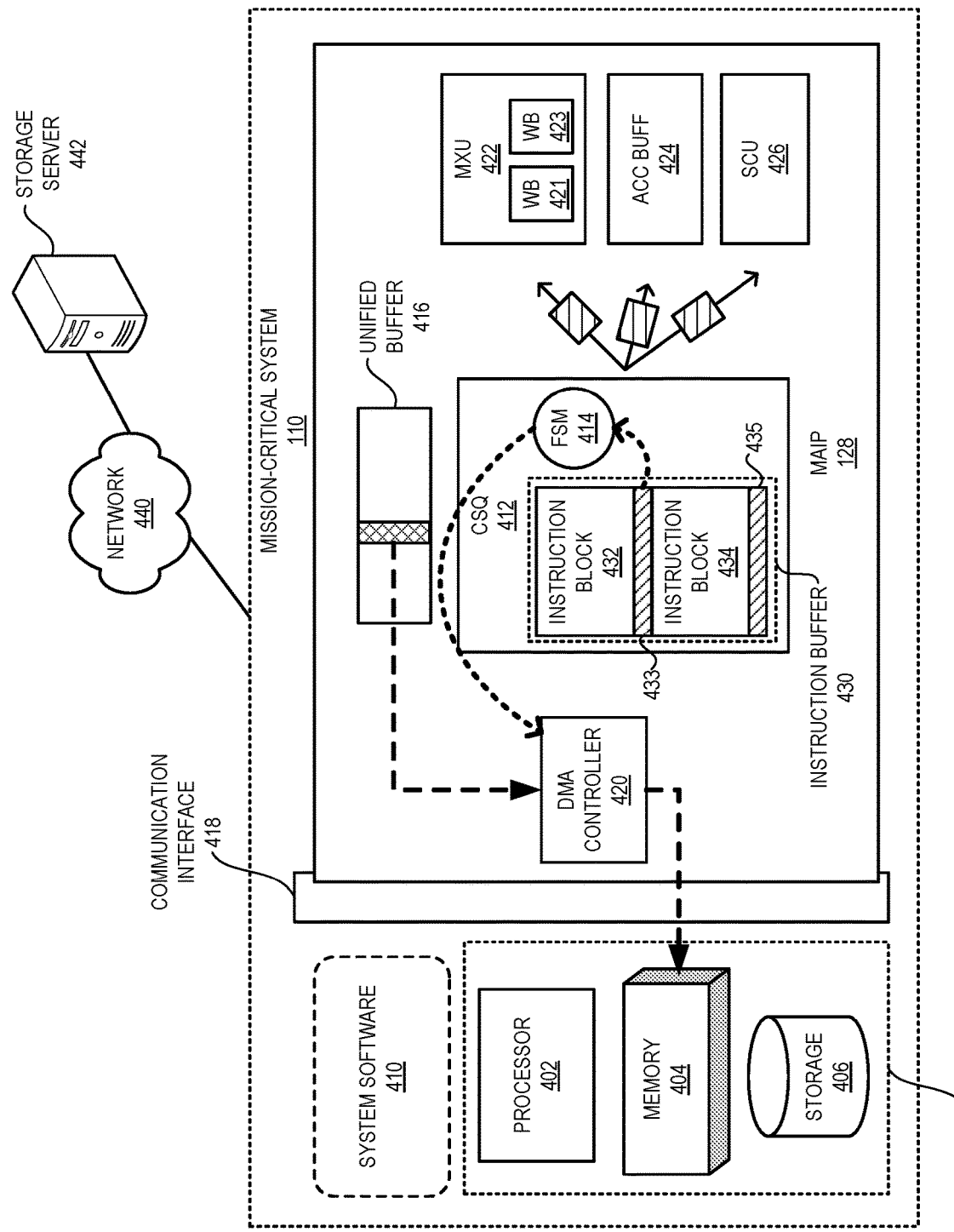
FIG. 4A illustrates an exemplary architecture of an MAIP supporting hardware-initiated storage instructions, in accordance with an embodiment of the present application.

FIG. 4A illustrates an exemplary architecture of an MAIP supporting hardware-initiated storage instructions, in accordance with an embodiment of the present application. In this example, system hardware 116 of system 110 includes a system processor 402 (i.e., the central processor of system 110), a memory device 404 (i.e., the main memory of system 110), and a storage device 406. Here, memory device 404 and storage device 406 are off-chip. MAIP 128 can include a systolic array of parallel processing engines. In some embodiments, the processing engines form a matrix multiplier unit (MXU) 422. MXU 422 can include a number of write buffers 421 and 423. MAIP 128 can also include an accumulation buffer (e.g., an accumulator) 424, which can be one or more registers that can store the data generated by the computations executed by MXU 422. MAIP 128 can also include a system control unit (SCU) 426.

MAIP 128 can also include a dedicated unit (or units), a command sequencer (CSQ) 412, to execute instructions in an on-chip instruction buffer 430 that control the systolic array (i.e., MXU 422) for computations. A finite state machine (FSM) 414 of CSQ 412 dispatches a respective instruction in instruction buffer 430. Depending on the current instruction (e.g., a fetch instruction), FSM 414 can also dispatch an instruction to buffer 424 for obtaining data stored in buffer 424. In addition, upon detecting a control instruction (e.g., an instruction to switch to a low-power mode), FSM 414 may dispatch an instruction to SCU 426.

Data generated by intermediate computations from MXU 422 are stored in an on-chip unified buffer 416. For the example in FIG. 3, stage contexts 312 and 314 can be stored in unified buffer 416. Data from unified buffer 416 can be input to subsequent computations. Accordingly, MXU 422 can retrieve data from unified buffer 416 for the subsequent computations. MAIP 128 can also include a direct memory access (DMA) controller 420, which can transfer data between memory device 404 and unified buffer 416.

MAIP 128 can use a communication interface 418 to communicate with components of system 110 that are external to MAIP 128. Examples of interface 418 can include, but are not limited to, a PCIe interface and a network interface card (NIC). MAIP 128 may obtain instructions and input data, and provide output data and/or the recorded contexts using interface 418. For example, the instructions for AI-related computations are sent from system software 410 (e.g., an operating system) of system 110 to instruction buffer 430 via interface 418. Similarly, DMA controller 420 can send data in unified buffer 416 to memory device 404 via interface 418.

During operation, software 410 provides instruction blocks corresponding to the computations associated with an AI operation. For example, software 410 can provide an instruction block 432 comprising one or more instructions to be executed on MAIP 128 via interface 418. Instruction block 432 can correspond to one computational stage of an AI model (e.g., a neural network). Similarly, software 410 can provide another instruction block 434 corresponding to a subsequent computational stage of the AI model. Instruction blocks 432 and 434 are stored in instruction buffer 430.

To facilitate the record and replay operations of system 110, MAIP 128 can support a hardware-initiated store instruction, which can be an individual instruction or an instruction set, to facilitate recording of the intermediate stage contexts. This recording can be stored in on-chip or off-chip memory devices. Software 410 determines the execution sequence associated with instruction blocks 432 and 434, and determines where this instruction should be inserted. For example, if instruction blocks 432 and 434 correspond to two stages of computation of the AI model, software 410 can insert a store instruction 433 after instruction block 432 and another store instruction 435 after instruction block 434.

Upon completion of execution of instruction block 432, data generated from the execution is stored in unified buffer 416. Based on the sequence in instruction buffer 430, FSM 414 retrieves store instruction 433, and accordingly, instructs DMA controller 420 to initiate a transfer from unified buffer 416. DMA controller 420 then transfers the data from unified buffer 416 to memory device 404. This records the intermediate stage contexts, thereby providing access to the stage contexts from outside of MAIP 128. Similarly, upon completion of execution of instruction block 434, data generated from the execution is stored in unified buffer 416. Based on store instruction 435, DMA controller 420 transfers the data from unified buffer 416 to memory device 404.

For a more persistent storage, data can be transferred from memory device 404 to storage device 406. This allows retrieval of the contexts in case of a failure of system 110. DMA controller 420 can also record the contexts directly through common communication channels (e.g., using remote DMA (RDMA)) via a network 440 to non-local storage on a remote storage server 442. In some embodiments, storage server 442 can be equipped with a software simulator or another MAIP that can replay the stored results.

Software 410 can preload store instructions 433 and 435 prior to runtime or insert them dynamically during runtime. For example, when system 110 powers up, software 410 may load instruction blocks 432 and 434 to instruction buffer 430 prior to runtime. Software 410 can preload instructions 433 and 435 with instruction blocks 432 and 434. This can prevent disruption of operations of MAIP 128. Software 410 can also dynamically insert instructions 433 and 435 during runtime to accommodate a dynamic scenario. For example, if system 110 facilitates safety features of a car, an adverse weather condition may increase the chances of a failure. To analyze a potential failure, software 410 can dynamically insert store instructions upon detecting the adverse weather condition.

The timing, frequency, and locations to insert store instructions 433 and 435 can be parameterized or computed based on storage size, communication bandwidth, and external inputs, such as a policy of a datacenter, customer preferences, developer preferences, and environmental feedback, etc. For example, a user can configure how frequently the contexts are recorded. Similarly, the external environment (e.g., an adverse weather condition) can trigger the recording of contexts. If available storage in memory device 404 and/or storage device 406 becomes constrained, software 410 may refrain from further inserting the store instruction or even remove one or more store instructions from instruction buffer 430.

Figure 4B:
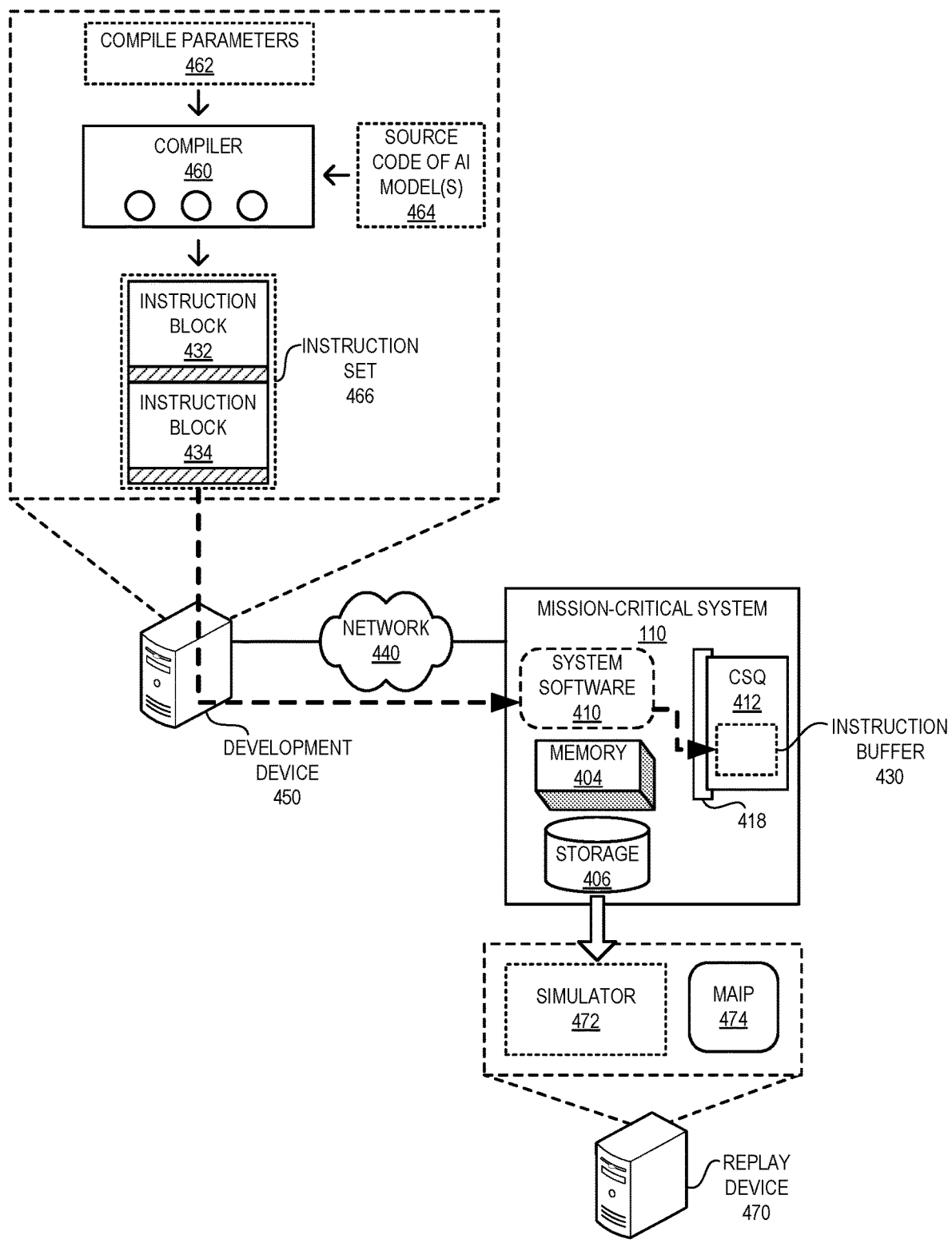
FIG. 4B illustrates an exemplary incorporation of hardware-initiated storage instructions in an MAIP, in accordance with an embodiment of the present application.

FIG. 4B illustrates an exemplary incorporation of hardware-initiated storage instructions in an MAIP, in accordance with an embodiment of the present application. Software 410 can generate the execution sequence for the instructions in instruction buffer 430, which can include the store instructions inserted by software 410. In some embodiments, a compiler 460 inserts the store instructions during compile time. During operation, compiler 460 executes on a development device 450 to compile source code 464 of the AI model(s) (e.g., a piece of code based on an AI library, such as TensorFlow and Theano).

Compiler 460 can also obtain a set of compile parameters 462, which can specify the timing, frequency, and locations of the store instructions that are to be inserted. For example, upon compiling code 464, compiler 460 can generate an instruction set 466 that can be executed on an MAIP. This compilation process generates instructions supported by the MAIP. Instruction set 466 can include instruction blocks 432 and 434. During compile time, compiler 460 determines where the store instructions should be inserted. It should be noted that the store instructions can be inserted at any of the stages of the compilation process (e.g., in any of the pre-processing, compilation, assembly, and linking stages).

Suppose that compile parameters 462 indicate that a store instruction should be inserted after each stage of computation of an AI model (e.g., a neural network). In the example in FIG. 4A, if instruction blocks 432 and 434 correspond to two stages of computation of an AI model, compiler 460 can insert store instruction 433 after instruction block 432 and store instruction 435 after instruction block 434. On the other hand, if compile parameters 462 indicate that a store instruction should be inserted after an initial stage of computation of the AI model, compiler 460 may insert store instruction 433 after instruction block 432 and but may not insert a store instruction after instruction block 434.

Upon generating instruction set 466, development device 450 provides instruction set 466 to system 110 via network 440. Software 410 obtains instruction set 466 and loads it on instruction buffer 430 via interface 418. It should be noted that compiler 460 can also run on software 410 of system 110. Under such circumstances, instruction set 466 can be generated in memory device 404. Software 410 can then load instruction set 466 on instruction buffer 430 from memory device 404 via interface 418.

The recorded contexts can reside in memory device 404. Software 410 can periodically transfer the contexts from memory device 404 to storage device 406. For example, if the size of the stored contexts reaches a threshold, software 410 can transfer the contexts from memory device 404 to storage device 406. In some embodiments, the contexts in storage device 406 can be transferred to a replay device 470 for further analysis. Replay device 470 can include a software simulator 472, which can simulate the operations of an MAIP. Replay device 470 can also include another MAIP 474. The recorded contexts can be replayed on simulator 472 and/or MAIP 474 to analyze the recorded contexts. It should be noted that the same physical device can serve as development device 450, replay device 470, and storage server 442, as described in conjunction with FIGS. 4A and 4B.

Operations

Figure 5A:
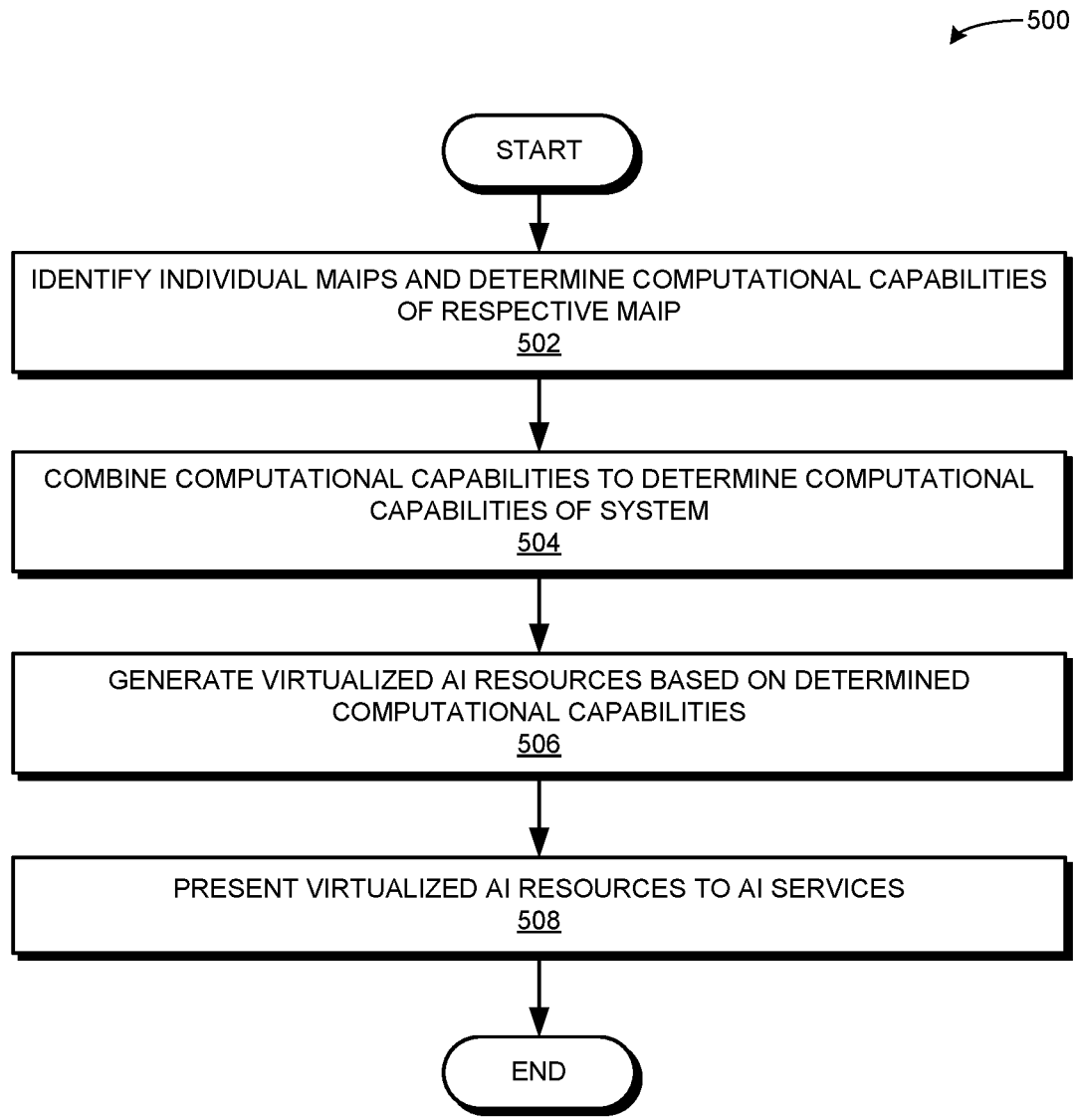
FIG. 5A presents a flowchart illustrating a method of a mission-critical system virtualizing available AI resources, in accordance with an embodiment of the present application.

FIG. 5A presents a flowchart 500 illustrating a method of a mission-critical system virtualizing available AI resources, in accordance with an embodiment of the present application. During operation, the system identifies individual MAIPs of the system and determines computational capabilities of a respective MAIP (operation 502). The system then combines the computational capabilities to determine computational capabilities of the system (operation 504) and generates virtualized AI resources based on the determined computational capabilities (operation 506). The system presents the virtualized AI resources to the AI services running on the system (operation 508).

Figure 5B:
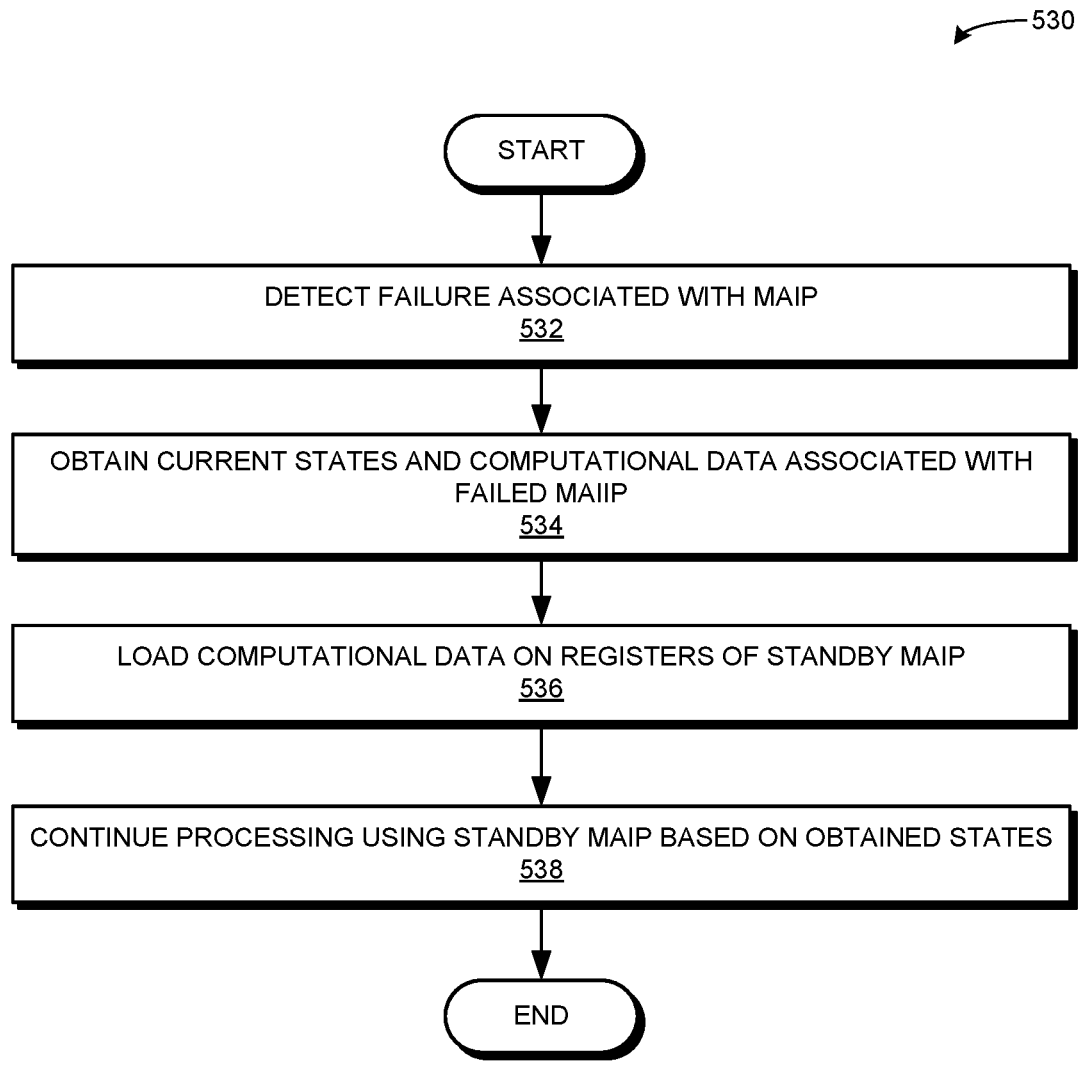
FIG. 5B presents a flowchart illustrating a method of a mission-critical system facilitating high availability, in accordance with an embodiment of the present application.

FIG. 5B presents a flowchart 530 illustrating a method of a mission-critical system facilitating high availability, in accordance with an embodiment of the present application. During operation, the system detects a failure associated with an MAIP (operation 532) and obtains current states and computational data associated with the failed MAIP (operation 534) (e.g., from a state buffer of the system). The system then loads the computational data on the registers of a standby MAIP of the system (operation 536) and continues processing using the standby MAIP based on the obtained states (operation 538).

Figure 5C:
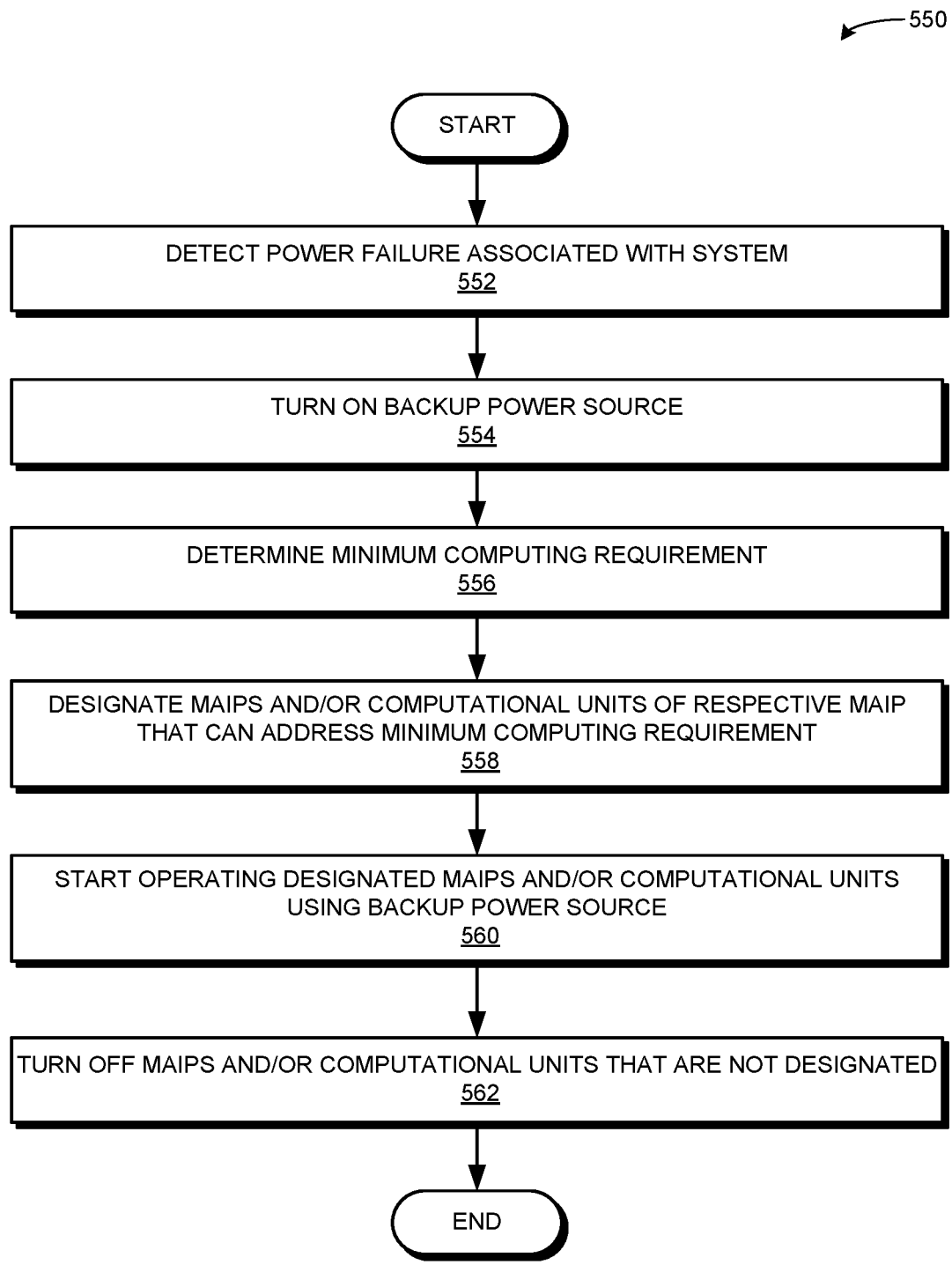
FIG. 5C presents a flowchart illustrating a method of a mission-critical system operating using low power with reduced performance, in accordance with an embodiment of the present application.

FIG. 5C presents a flowchart illustrating a method of a mission-critical system operating using low power with reduced performance, in accordance with an embodiment of the present application. During operation, the system detects a power failure associated with the system (operation 552) and turns on a backup power source (operation 554) (e.g., a battery). The system then determines a minimum computing requirement (operation 556). The system may determine the computing requirement based on one or more of: a configuration of the system, an input from the environment of the system, and a user input.

The system then designates the MAIPs and/or computational units, such as TPUs, of a respective MAIP that can address the minimum computing requirement of the system (operation 558). The system then starts operating the designated MAIPs and/or the computational units using the backup power source (operation 560). The system turns off the MAIPs and/or the computational units that are not designated (operation 562). In this way, the system can save power by using computational resources only for the minimum computing requirement and not for anything else. In other words, the system can save power by turning off computational resources that are not used for the minimum computing requirement.

Figure 6A:
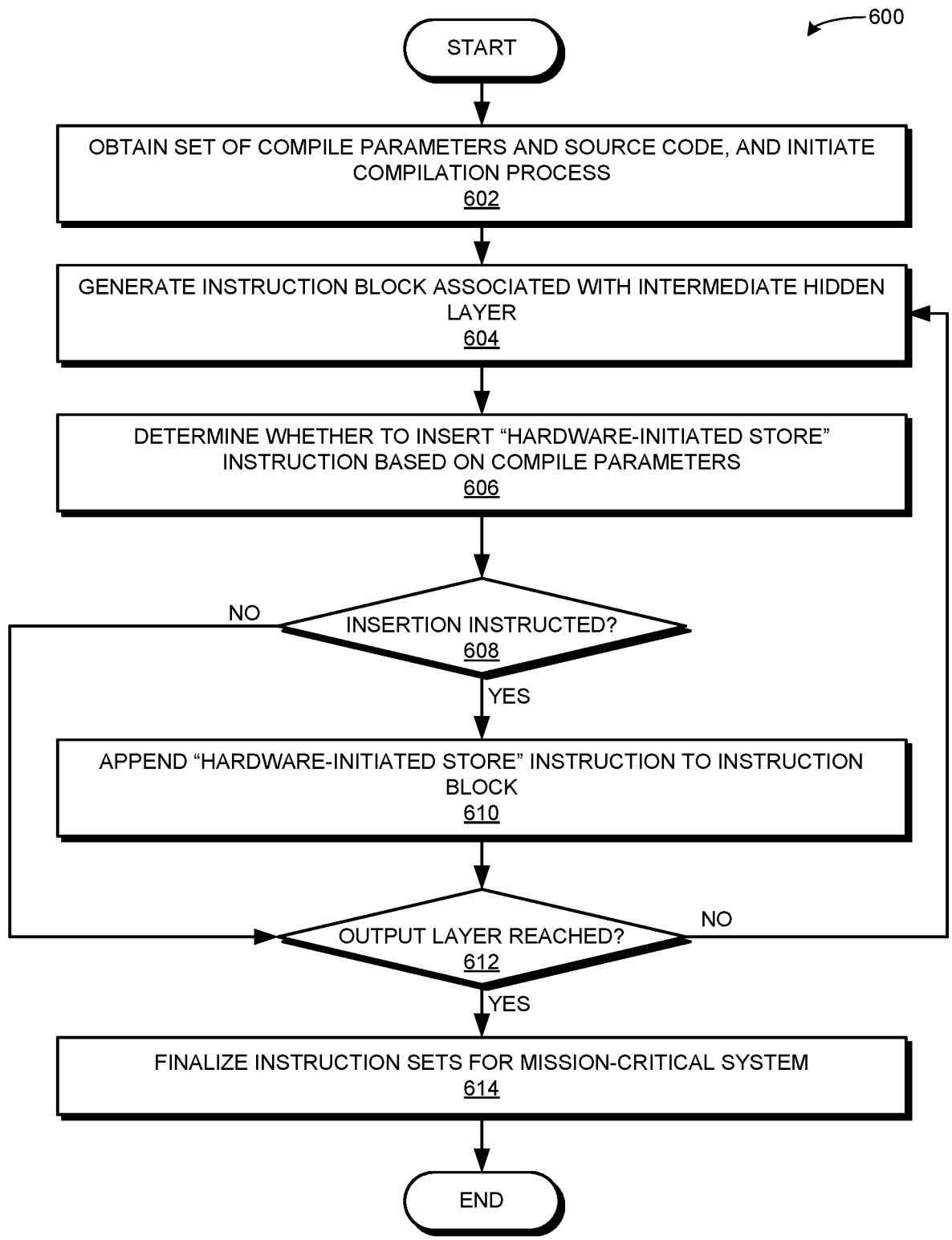
FIG. 6A presents a flowchart illustrating a method of a compiler incorporating hardware-initiated storage instructions into instruction blocks associated with intermediate layers, in accordance with an embodiment of the present application.

FIG. 6A presents a flowchart illustrating a method of a compiler incorporating hardware-initiated storage instructions into instruction blocks associated with intermediate layers, in accordance with an embodiment of the present application. During operation, the compiler obtains a set of compile parameters and the source code, and initiates a compilation process (operation 602). The compiler can generate an instruction block associated with an intermediate hidden layer (operation 604) and determines whether to insert a "hardware-initiated store" instruction based on the compile parameters (operation 606).

If an insertion is instructed in the compile parameters (operation 608), the compiler appends a "hardware-initiated store" instruction to the instruction block (operation 610). On the other hand, if an insertion is not instructed (operation 608), the compiler checks whether an output layer has been reached at the source code (operation 612). If an output layer has been reached (operation 612), the compiler can finalize the instruction sets for a mission-critical system (operation 614). Otherwise, the compiler continues to generate an instruction block associated with an intermediate hidden layer (operation 604).

Figure 6B:
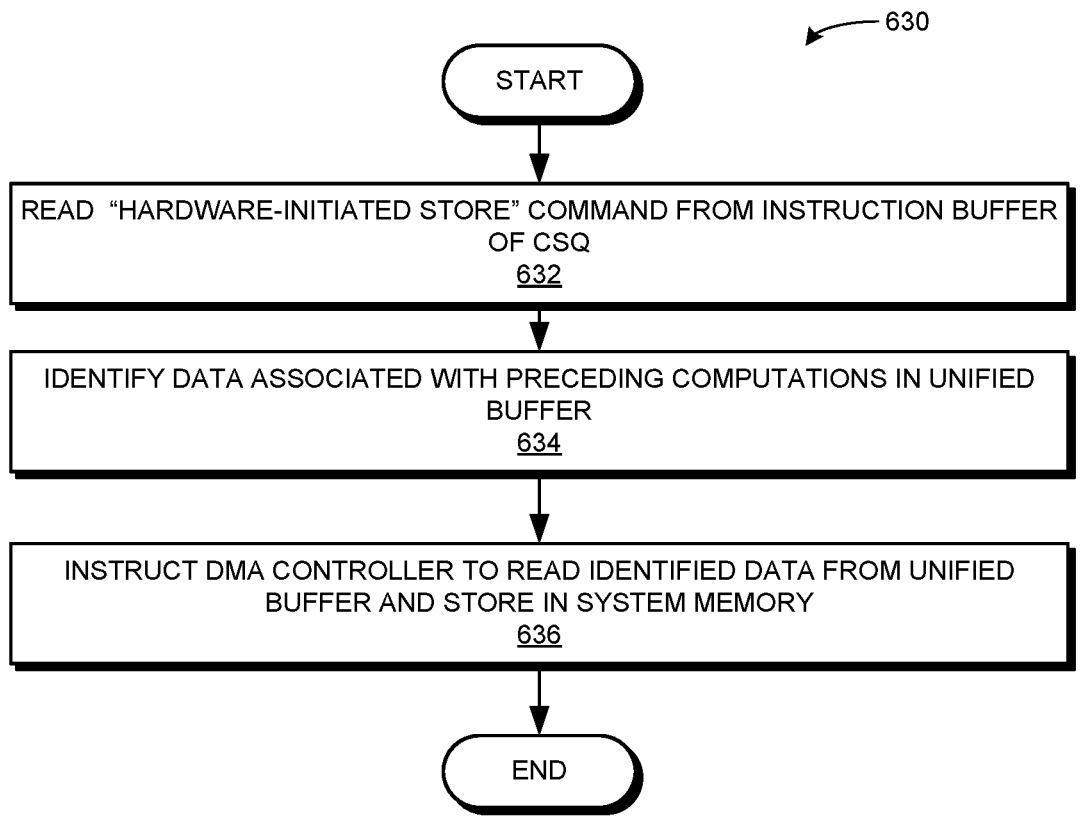
FIG. 6B presents a flowchart illustrating a method of a dispatcher of an MAIP executing a hardware-initiated storage instruction, in accordance with an embodiment of the present application.

FIG. 6B presents a flowchart illustrating a method of a dispatcher of an MAIP executing a hardware-initiated storage instruction, in accordance with an embodiment of the present application. In some embodiments, the dispatcher can be an FSM in a CSQ of the MAIP. During operation, the dispatcher reads a "hardware-initiated store" instruction from an instruction buffer of a CSQ (operation 632). The dispatcher identifies the data associated with the preceding computations in the unified buffer of the MAIP (operation 634). The dispatcher then instructs the DMA controller of the MAIP to read the identified data from the unified buffer and store the data in the system memory (operation 636).

Exemplary Computer System and Apparatus

Figure 7:
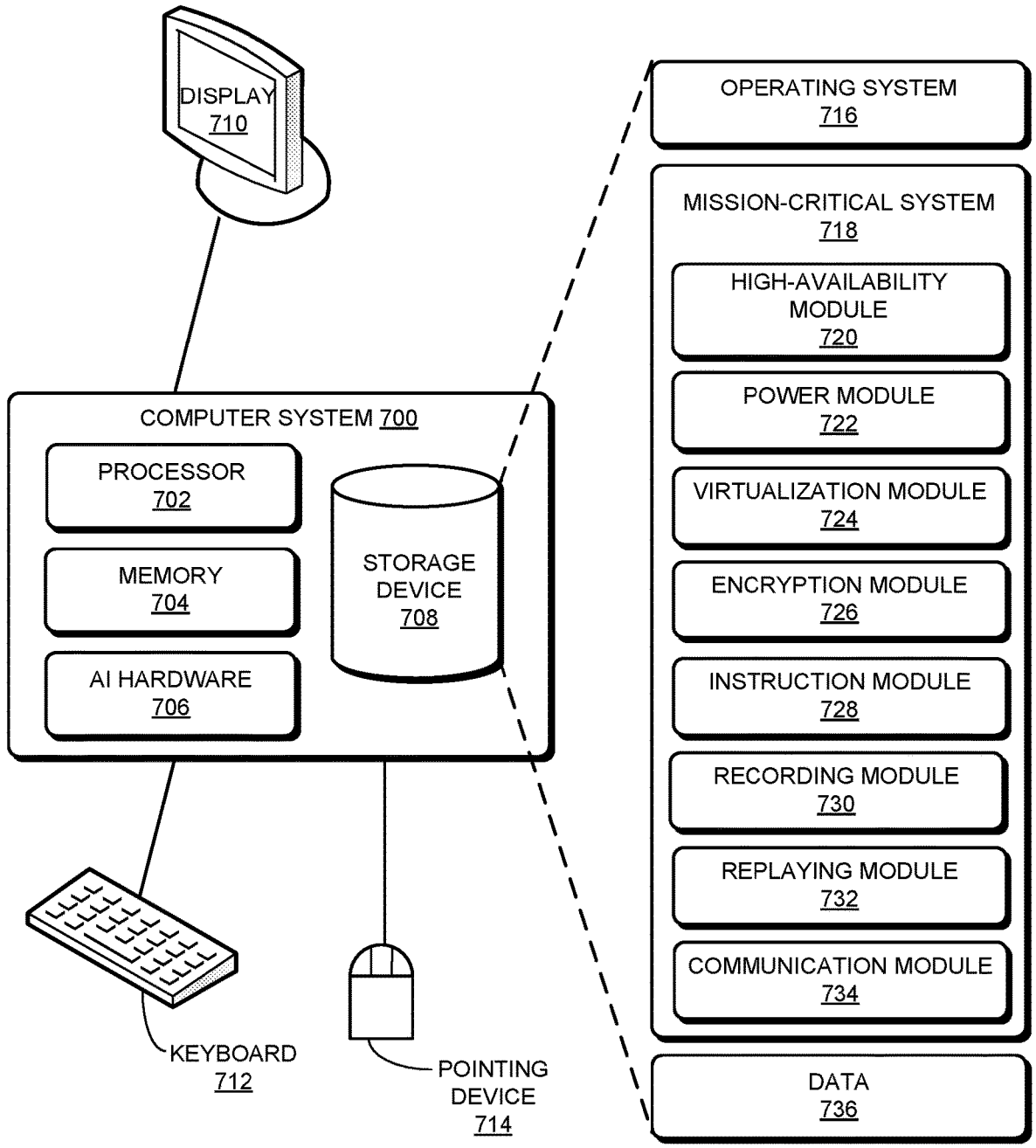
FIG. 7 illustrates an exemplary computer system supporting a mission-critical system, in accordance with an embodiment of the present application.

FIG. 7 illustrates an exemplary computer system supporting a mission-critical system, in accordance with an embodiment of the present application. Computer system 700 includes a processor 702, a memory device 704, and a storage device 708. Memory device 704 can include a volatile memory device (e.g., a dual in-line memory module (DIMM)). Furthermore, computer system 700 can be coupled to a display device 710, a keyboard 712, and a pointing device 714. Storage device 708 can store an operating system 716, a mission-critical system 718, and data 736. Mission-critical system 718 can facilitate the operations of one or more of: mission-critical system 110, storage server 442, compiler 460, and replay device 470. In some embodiments, computer system 700 can also include AI hardware 706 comprising one or more MAIPs, as described in conjunction with FIG. 1A.

Mission-critical system 718 can include instructions, which when executed by computer system 700 can cause computer system 700 to perform methods and/or processes described in this disclosure. Specifically, mission-critical system 718 can include instructions for a mission-critical system facilitating high-availability among the MAIPs of AI hardware 706 (high-availability module 720). Mission-critical system 718 can also include instructions for the mission-critical system operating AI hardware 706 to address a minimum computing requirement in the event of a power failure (power module 722).

Furthermore, mission-critical system 718 includes instructions for the mission-critical system virtualizing the resources of AI hardware 706 (virtualization module 724). Moreover, mission-critical system 718 includes instructions for the mission-critical system encrypting data generated by AI hardware 706 (encryption module 726). Mission-critical system 718 can also include instructions for a compiler to insert a "hardware-initiated store" instruction into the instructions that can be executed on the MAIPs of AI hardware 706 (instruction module 728).

Mission-critical system 718 can further include instructions for the mission-critical system recording contexts by executing "hardware-initiated store" instructions (e.g., either in the mission-critical system or in a remote storage server) (recording module 730). Mission-critical system 718 can also include instructions for a replay device replaying the recorded contexts (replaying module 732). Mission-critical system 718 may further include instructions for the mission-critical system, the storage server, the compiler, and the replay device sending and receiving messages (communication module 734).

Data 736 can include any data that can facilitate the operations of one or more of: mission-critical system 110, storage server 442, compiler 460, and replay device 470. Data 736 may include one or more of: the source code, instructions generated by compiling the source code, "hardware-initiated store" instructions, and the recorded contexts.

Figure 8:
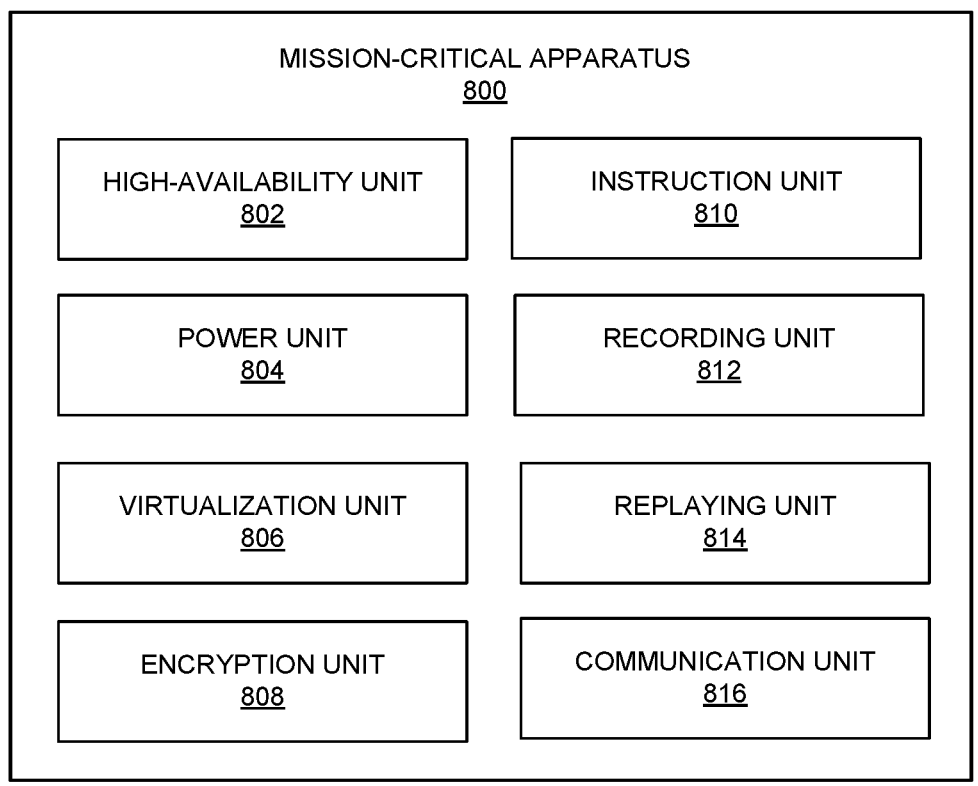
FIG. 8 illustrates an exemplary apparatus that supports a mission-critical system, in accordance with an embodiment of the present application.

FIG. 8 illustrates an exemplary apparatus that supports a mission-critical system, in accordance with an embodiment of the present application. Mission-critical apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device that is capable of communicating with other computer systems and/or devices. Specifically, apparatus 800 can comprise units 802-816, which perform functions or operations similar to modules 720-734 of computer system 700 of FIG. 7, including: a high-availability unit 802; a power unit 804; a virtualization unit 806; an encryption unit 808; an instruction unit 810; a recording unit 812; a replaying unit 814; and a communication unit 816.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A mission-critical processor, comprising:
an instruction buffer configured to store two or more instructions, wherein said two or more instructions comprise one or more artificial intelligence (AI) processing instructions and one or more hardware-initiated store instructions;
processing circuitry configured to compute an intermediate stage of an artificial intelligence (AI) model according to a current instruction if the current instruction belongs to said one or more AI processing instructions;
a data buffer configured to store data generated from executing the current instruction if the current instruction belongs to said one or more AI processing instructions; and
dedicated circuitry configured to transfer the data from the data buffer to a memory device of a computing system if the current instruction belongs to said one or more hardware-initiated store instructions, wherein the data is transferred without software involvement from a system processor of the computing system, and wherein the memory device is outside the mission-critical processor; and
wherein the dedicated circuitry is further configured to store computational states of the processing circuitry in a state buffer of the computing system, thereby allowing a second mission-critical processor of the computing system to resume operations associated with the computational states.

2. The mission-critical processor of claim 1, wherein the data is transferred via a communication interface, and the communication interface is one of:
a peripheral component interconnect express (PCIe) interface; and
a network interface card (NIC).

3. The mission-critical processor of claim 1, further comprising encryption circuitry configured to encrypt the data in the data buffer.

4. The mission-critical processor of claim 1, wherein the processing circuitry includes a plurality of processing units comprising one or more of:
a dataflow processing unit (DPU) comprising a scalar computing unit and a vector computing unit; and
a tensor computing unit (TCU) comprising a cluster of DPUs, high-bandwidth memory devices, and input/output (I/O) devices.

5. The mission-critical processor of claim 4, further comprising control circuitry configured to operate the processing circuitry in a low-power mode by turning off one or more processing units of the plurality of processing units.

6. The mission-critical processor of claim 1, wherein the dedicated circuitry is further configured to store the data in a storage device of a remote computing device via a communication interface using a remote memory access protocol.

7. The mission-critical processor of claim 1, wherein the instruction buffer is configured to store said two or more instructions by one of:
storing said two or more instructions prior to runtime; and
storing said one or more AI processing instructions prior to runtime and dynamically inserting said one or more hardware-initiated store instructions.

8. The mission-critical processor of claim 1, wherein the dedicated circuitry, based on the hardware-initiated store instruction, is further configured to transfer contextual information associated with the mission-critical processor to the memory device, wherein the contextual information includes one or more of:
feature maps associated with the data in the data buffer;
information associated with one or more computational units of the mission-critical processor, wherein the information includes one or more of:
temperatures;
working conditions;
utilization; and
performance statistics.

9. A computer-implemented method for facilitating instructions to a mission-critical artificial intelligence (AI) processor, the method comprising:
fetching a current instruction from an instruction buffer, wherein the instruction buffer stores two more instructions comprising one or more artificial intelligence (AI) processing instructions and one or more hardware-initiated store instructions;
configuring processing circuitry to compute an intermediate stage of an AI model according to the current instruction if the current instruction belongs to said one or more AI processing instructions;
configuring a data buffer to store data generated from executing the current instruction if the current instruction belongs to said one or more AI processing instructions; and configuring dedicated circuitry to transfer the data from the data buffer to a memory device of a computing system if the current instruction belongs to said one or more hardware-initiated store instructions, wherein the data is transferred without software involvement from a system processor of the computing system, and wherein the memory device is outside the mission-critical AI processor; and wherein timing, frequency, or locations to insert a target hardware-initiated store instruction after a target AI processing instruction depends on a set of parameters and wherein the set of parameters includes available storage, communication bandwidth, and external inputs, which includes a policy of a datacenter, customer preferences, developer preferences, and environmental feedback.

10. The method of claim 9, further comprising providing said two or more instructions to the mission-critical AI processor prior to runtime of the mission-critical AI processor.

11. A mission-critical system, the mission-critical system comprising:
   a system processor;
   a system memory device;
   a communication interface; and
   a first mission-critical processor coupled to the communication interface, wherein the first mission-critical processor comprises:
   an instruction buffer configured to store two or more instructions, wherein said two or more instructions comprise one or more artificial intelligence (AI) processing instructions and one or more hardware-initiated store instructions;
   processing circuitry configured to compute an intermediate stage of an artificial intelligence (AI) model according to a current instruction if the current instruction belongs to said one or more AI processing instructions;
   a data buffer configured to store data generated from executing the current instruction if the current instruction belongs to said one or more AI processing instructions; and
   dedicated circuitry configured to transfer the data from the data buffer to the system memory device of the mission-critical system without software involvement from the system processor of the mission-critical system, wherein the system memory device is outside the first mission-critical processor;
   an operating module configured to load said two or more instructions in the instruction buffer of the first mission-critical processor,
   a backup power source; and
   power circuitry configured to:
      detect a power failure of the mission-critical system;
      switch the first mission-critical processor to the backup power source; and
      reduce operations of the first mission-critical processor to save power.

12. The mission-critical system of claim 11, wherein the communication interface is one of:
   a peripheral component interconnect express (PCIe) interface; and
   a network interface card (NIC).

13. The mission-critical system of claim 11, wherein the processing circuitry of the first mission-critical processor includes a plurality of processing units comprising one or more of:
   a dataflow processing unit (DPU) comprising a scalar computing unit and a vector computing unit; and
   a tensor computing unit (TCU) comprising a cluster of DPUs, high-bandwidth memory devices, and input/output (I/O) devices.

14. The mission-critical system of claim 11, further comprising a network interface configured to transfer the data from the system memory device to a remote computing system for replaying the data.

15. The mission-critical system of claim 11, wherein the operating module is configured to load said two or more instructions by one of:
   loading said two or more instructions prior to runtime; and
   loading said one or more AI processing instructions prior to runtime and dynamically inserting said one or more AI processing instructions during runtime.

16. The mission-critical system of claim 11, wherein the dedicated circuitry of the first mission-critical processor, based on the hardware-initiated store instruction, is further configured to transfer contextual information associated with the first mission-critical processor to the system memory device, wherein the contextual information includes one or more of:
   feature maps associated with the data in the data buffer; and
   information associated with one or more computational units of the first mission-critical processor, wherein the information includes one or more of:
   temperatures;
   working conditions;
   utilization; and
   performance statistics.

17. A mission-critical system, the mission-critical system comprising:
   a system processor;
   a system memory device;
   a communication interface; and
   a first mission-critical processor coupled to the communication interface, wherein the first mission-critical processor comprises:
   an instruction buffer configured to store two or more instructions, wherein said two or more instructions comprise one or more artificial intelligence (AI) processing instructions and one or more hardware-initiated store instructions;
   processing circuitry configured to compute an intermediate stage of an artificial intelligence (AI) model according to a current instruction if the current instruction belongs to said one or more AI processing instructions;
   a data buffer configured to store data generated from executing the current instruction if the current instruction belongs to said one or more AI processing instructions; and
   dedicated circuitry configured to transfer the data from the data buffer to the system memory device of the mission-critical system without software involvement from the system processor of the mission-critical system, wherein the system memory device is outside the first mission-critical processor;
   an operating module configured to load said two or more instructions in the instruction buffer of the first mission-critical processor;
   a state buffer configured to store computational states of the first mission-critical processor; and high-availability circuitry configured to:
  detect a failure of the first mission-critical processor;
  load the computational states of the first mission-critical processor to a second mission-critical processor from the state buffer; and
  resume operations associated with the computational states using the second mission-critical processor.

* * * * *